Feb. 2, 1965  A R. RICH  3,168,100
CONTACT LENS DIPPER ASSEMBLY
Filed Dec. 7, 1962
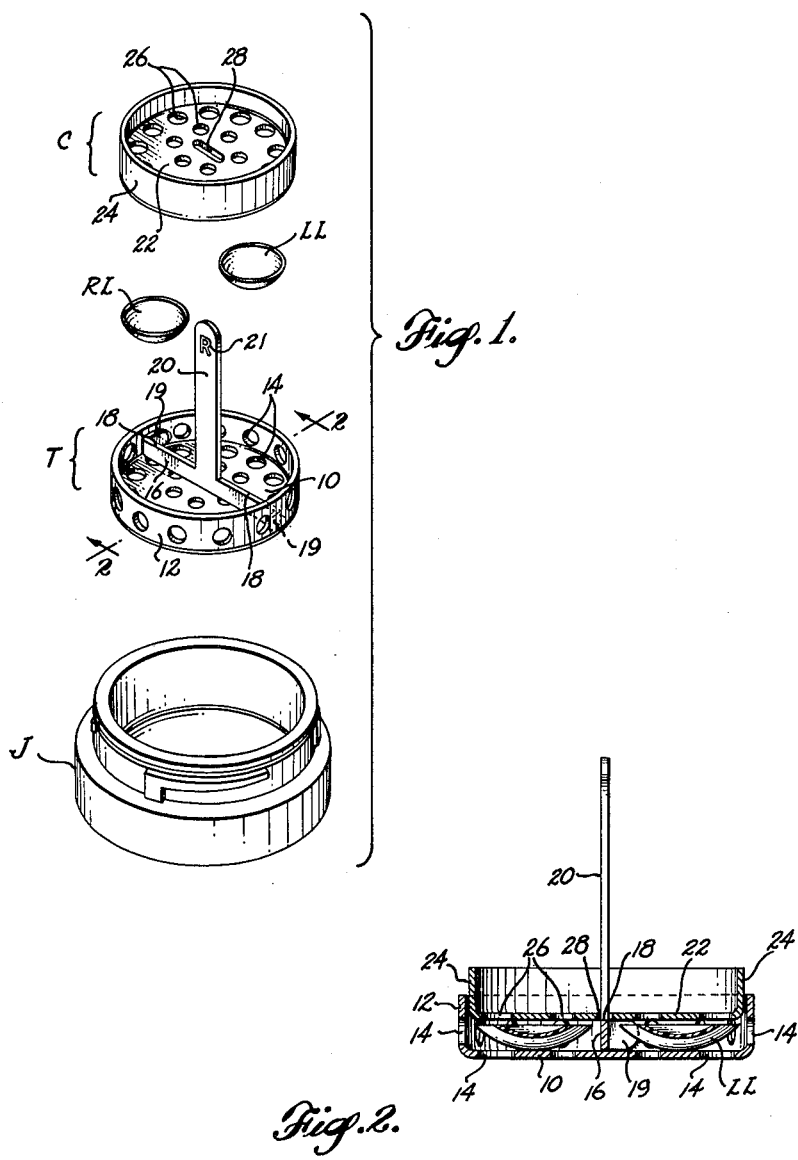
INVENTOR.
ALVIDO R. RICH
BY Mathis and Graybeal
ATTORNEYS

United States Patent Office 3,168,100
Patented Feb. 2, 1965

3,168,100
CONTACT LENS DIPPER ASSEMBLY
Alvido R. Rich, Portland, Oreg.
(1009 Main St., Vancouver, Wash.)
Filed Dec. 7, 1962, Ser. No. 246,857
8 Claims. (Cl. 134—137)

This application is a continuation-in-part of my co-pending and now abandoned application Serial No. 92,-641, filed March 1, 1961.

In my copending application Serial No. 12,291, filed March 2, 1960, entitled Surface Tinted Contact Lenses, there is disclosed various techniques for surface tinting of contact lenses involving successive dipping of lenses into baths of treating solution, e.g. cleaning solution, tinting solution, rinsing solution, tint removal solution, sterilizing solution, and the like.

In developing a uniformly distributed surface tint on a plastic contact lens, it is important to dip the lenses in a manner so that all lens surfaces are contacted by the solution a substantially uniform time. Otherwise unevenness or spottiness in tint distribution occurs. Also, plastic contact lenses are by their nature quite susceptible to becoming scratched, nicked, or even broken if not properly handled. And, because of their light weight, smallness and concave configuration, they are rather awkward to properly handle with a spatula or tweezers and have a tendency to resist complete immersion in a treating solution, i.e. they tend to float on the solution.

To avoid the difficulties and delicacies of handling necessary when the lenses are subjected to a series of immersion steps, and to provide uniformity in the time of contact of the lens surfaces with treating solution, the present invention offers a specialized dipper assembly by means of which uniformity of time of contact of tinting or like treating solutions with the lenses is assured, by which the lenses are kept isolated from each other, and by which the specific identification of each lens is maintained. Notwithstanding the isolated compartmentation for the lenses as provided by the dipper assembly, its readily removable cover and shallow tray construction provides ready accessibility to the lenses, as for periodic wiping of the lenses between dipping steps. The cover also provides that the lenses are kept from floating out of the dipper and are positively, fully immersed in the treating solution.

Specific dipper construction is also presented which establishes the cover in a loosely nested position within the tray, the cover nonetheless being firmly supported out of pressurized contact with the lenses, to avoid marring or scratching of the lenses and to avoid the possibility of non-contact of treating solution with localized areas of the lenses. Further, the plastic contact lens dipper assembly of the present invention includes an unbroken separator wall bisecting the lens tray to provide an unbroken partition between the tray halves in which the lenses are placed, which separator wall is of a height slightly greater than the overall thickness dimension of the lenses, and which wall serves as the sole supporting member for the cover part of the assembly, each lens thereby having a separate compartmentation without any rough edges or sharp corners to scratch the lens edges.

It is a further advantageous feature of the specific lens dipper assembly here presented that the cover thereof can be rocked or teetered on the tray separator wall a limited degree while the assembly and its contained lenses are in the treating solution, without risk of the lenses being scratched or marred, which rocking action can provide effective agitation of the treating solution to improve circulation thereof and consequently ensure adequate and uniform exposure of all portions of the lens surfaces to the treating solution.

These and other objects, features and advantages of the plastic contact lens dipper assembly of the invention will be apparent from the following description of a typical form thereof, taken in connection with the accompanying illustrations of same, wherein like designations refer to like parts, and wherein:

FIG. 1 is an exploded isometric view of my plastic contact lens dipper assembly, with a pair of contact lenses also being shown to illustrate placement thereof, such assembly being shown with a suitable treating solution containing jar of a commonly used type; and FIG. 2 is a cross-sectional side view of the dipper assembly shown in FIG. 1, with the contact lenses in place in the tray and the cover thereof in lens retaining position, to more particularly show the relation of the assembly parts when operatively assembled.

Turning now to a more specific consideration of the accompanying illustrations, FIG. 1 in exploded view shows a typical lens treating assembly, including a dipper assembly as associated with a suitable treating solution container such as a squat jar J of a type conventional per se. In general, the dipper assembly comprises a tray part T and a cover part C, said tray part T being constituted by a floor portion 10 and an upstanding peripheral wall 12, said floor 10 and wall 12 having numerous holes therein, certain of which are indicated at 14, for ready ingress and egress of treating solution. Preferably, wall 12 of shallow tray T is just slightly smaller in outer dimension than the inner dimension of solution containing jar J (which is about 1 3/16" in an existing commercial form, for example), in order that there be maximum utilization of the treating solution without wastage.

Said shallow tray T specifically and importantly also comprises an upstanding, separator wall or rib 16 dividing the tray T into two halves and of a height along its upper edge 18 to be of a height slightly greater than the overall thickness of contact lenses RL and LL, which are thus denoted to identify respectively the right lens (RL) and the left lens (LL). Said separator wall or rib 16 also is advantageously continuous, i.e. non-foraminous, to obviate any possibility that the edges or convex surface area near the edges of the lenses RL and LL might become scratched or nicked. For the same reason, the holes 14 in tray floor 10 are positioned so that the lenses RL and LL, when placed in the dipper in the manner shown at FIG. 2, are supported on unbroken areas of floor 10.

Separator wall 16 effectively provides that said lenses RL and LL are kept out of contact with each other, i.e. separated while being handled into and out of the solution, and while being agitated in the solution.

As shown in FIG. 1, the ends of separator wall 16 are turned and suitably attached to wall 12, as by welds 19, so as to be integral therewith.

Extending upwardly and preferably centrally of said separator wall 16 is a handle post 20. Said handle post 20 preferably but not necessarily presents an identification mark such as the "R" designated at 21, to distinguish to the user which half of tray T contains the lens of corresponding designation. Thus, as will be apparent, the illustrated form of dipper provides the designation "R" denoted at 21 to signify to the user that the tray half on the same side as the designation is to have placed therein the right lens RL.

Cover C completes the dipper assembly and comprises a foraminous face 22 bounded by an upstanding wall or rim 24 of an outer dimension to nest rather snugly but not tightly within upstanding wall 12 of the tray T (cf. FIG. 2). When cover C is nested within tray T the upper portion of wall 24 extends substantially above the upper edge surface of tray wall 12 to provide a grasping surface facilitating removal of cover C from tray T. Numerous openings, certain of which are indicated at 26, are provided in cover plate 22 to cooperate with openings 14 of the tray T in providing quick ingress and egress of solution. Also provided in cover plate 22 is a central opening 28 configured to be just slightly larger than the lateral cross-section of handle post 20.

As will be apparent from FIG. 2, with the lenses RL and LL in place in the respective isolated compartmentation provided in tray T, and with cover C slid down over handle post 20 and in a position of rest on upper edge 18 of separator wall 16, there is substantial clearance between the upward portions of the lenses RL and LL and the lower surface of cover plate 22, and the wall 24 of the cover C is in nested position within the wall 12 of tray T. Such nesting of the cover C within tray T is advantageously not a tight fit as this would impede ready separation of the cover C from the tray T when insertion or removal of the lenses RL and LL from the tray T is desired, but is nonetheless of somewhat close tolerance so as to not permit such a degree of teetering of the cover C on separator wall 16 as to raise the possibility of injury of the lenses RL and LL when the dipper is being handled.

As shown in FIG. 2, the wall 24 of the cover C loosely nests within the wall 12 of the tray T and is supported only by the upper edge 18 of the separator wall 16. By this arrangement, the cover C is rockable a limited degree with respect to the tray T when the assembly and its contained lenses are immersed in the treating solution. The cover C, thus rockable, provides an effective agitation means by which the user can provide adequate circulation of the treating solution around the lenses so as to insure adequate and uniform exposure of all portions of the lens or surfaces to the treating solution.

Rocking of the cover C on the separator wall top edge 18 can be readily accomplished while the lenses are in the treating solution simply by tapping the cover with a spatula or tweezers, or by rocking the handle 20 back and forth slightly, for example.

As shown in FIG. 1, the jar J containing the treating solution and used in association with the lens dipper assembly is optimally only slightly larger than the tray T of the dipper assembly, so that no more of the treating solution need be used than is necessary to flood the lenses. Under this circumstance there is insufficient clearance between the outer wall of the tray T and the inner wall of the jar J to permit substantial agitation of the treating solution by lateral movement of the dipper assembly within the jar J. The rockable cover C, being a self-contained part of the dipper assembly, provides a means by which the treating solution can be agitated for more positive circulation around the lenses without having to provide room in jar J for this purpose. Agitation of the treating solution without lateral movement of the tray part of the lens dipper assembly is thus an important characteristic of my lens dipper assembly.

From the foregoing it will be seen that the dipper assembly of the invention is characterized by fully protected separation and retention of a pair of contact lenses in a foraminated shallow tray and under a foraminated cover supported only by the tray separator wall, which cover nests within the tray peripheral wall. It will be understood that, consistent with these considerations, there can be considerable variation as to specific form and construction of the assembly. Thus, it is further typical and non-limitive examples of change of form and construction, the handle post 20 can take any suitable cross-sectional form and can be hooked rather than straight, if desired. Also, various tray and cover peripheral shapes other than circular, such as oval, rectangular, or twin-circle cross-sectional shapes, can be used. Also, while separator wall 16 is shown as of thin, straight construction, it will be understood that such can be curvilinear in some instances, as desired. For most purposes, however, the simple circular form of tray cross-sectional shape illustrated is considered preferred, in that customarily used solution containers are circular in cross-section and the circular form of dipper assembly provides for maximum utilization of treating solution without wastage, as well as being easily cleanable. As will also be understood, while peripheral wall 12 of tray T and peripheral wall 24 of cover C are shown in the form of right angle cylinders and parallel to each other, it will be understood that such can have other surface interrelation consistent with the desired nested arrangement, such as a slightly outwardly flaring cover peripheral wall, and a bevelled or lipped tray wall, for example. The upper edge of the cover wall 24 can be outwardly lipped for example, to facilitate its being grasped and to also limit the extent to which the cover can rock in the tray. As to the material from which the dipper is constructed, and while metal is preferred because of certain treating solution in which the dipper assembly is immersed or at elevated temperature, it will be readily understood that in certain instances the material of construction could be non-metallic, as desired, e.g. plastic.

From the above considerations, various further forms, constructions, shapes, and elemental relations characteristic of the invention will be apparent to those skilled in the art, within the scope of the following claims.

What is claimed is:

1. A dipper assembly for contact lenses comprising a foraminous shallow tray with an upstanding peripheral wall, a separator wall integral within said peripheral wall and dividing said tray into two isolated compartments, each of a size to receive a contact lens, said separator wall being slightly higher than the overall height of a contact lens, a handle post integral with and standing upwardly from said separator wall, and foraminous cover means having an opening slippable over and substantially larger than said handle post, said peripheral wall being slightly higher than said separator wall and said cover when on said tray loosely nesting partly within the said peripheral wall and being supported in slightly spaced relation above contact lenses in the tray by resting solely on said separator wall, and partly standing above said peripheral wall so as to be readily graspable for removal from the tray.

2. A contact lens dipper assembly comprising a foraminous shallow tray with an upstanding peripheral wall, a separator wall bisecting said tray and providing two isolated compartments, each of a size to receive a contact lens, said separator wall being within said peripheral wall and being of a height slightly greater than the overall height of a contact lens, said tray peripheral wall being substantial higher than said separator wall, a handle post standing upwardly from said separator wall, and cover means having a foraminous face, an opening in such face substantially larger than and slippable over said handle post, and a peripheral upstanding wall, said cover when slipped over said handle of said tray being supported in slightly spaced relation above the contact lenses in the tray compartments by resting solely on the upper extending edge surface of said separator wall, and the base portion of the upstanding peripheral wall of said cover being loosely nested within said tray wall with its upper portion extending substantially above the upper edge of the tray wall to provide a grasping surface for easy removal of the cover from the base.

3. A dipper assembly according to claim 2, wherein said tray peripheral wall and said cover peripheral wall are substantially in the shape of right angle cylinders.

4. A plastic contact lens dipper assembly for immersing a pair of plastic contact lenses in a liquid bath, comprising a shallow, cup-shaped, foraminous tray having a peripheral wall and a non-foraminous separator wall integral with and substantially bisecting said tray, said separator wall being within said peripheral wall and being of a height slightly greater than the overall thickness dimension of a contact lens, and said peripheral wall being of a height greater than said separator wall, a handle integral with and upstanding centrally from said separator wall, and a foraminous, cup-shaped cover means provided with a central opening substantially larger than said handle and having a peripheral wall loosely nestable within the peripheral wall of said tray, said cover when slipped over said handle being supported only by the upper edge of said separator wall, so as to be rockable thereon and so as to not be in pressurized contact with contact lenses placed in said tray.

5. A plastic contact lens treating assembly for immersing a pair of plastic contact lenses to tint same or the like, comprising a shallow treating solution container, a shallow, cup-shaped, foraminous tray having an outside dimension just slightly smaller than the inside dimension of said container, said tray having a peripheral wall and a separator wall within said peripheral wall and substantially bisecting said tray, said separator wall being of a height slightly greater than the overall thickness dimension of a contact lens, and said peripheral wall of a height greater than said separator wall, a handle upstanding centrally from said separator wall, and a cup-shaped cover formed by a foraminous face and an upstanding peripheral wall, said cover being provided with a central opening substantially larger than said handle for receiving said handle, said cover wall being of a height substantially greater than the difference between the height of the tray peripheral wall and the height of the separator wall, said cover when slipped over said handle being supported only by the upper edge of said separator wall, so as to be rockable on said separator wall and so as to not be in pressurized contact with contact lenses placed in said tray, and having the upper portion of its peripheral wall extending substantially above the edge surface of the tray wall to provide a grasping surface for easy removal of the cover from the tray.

6. The plastic contact lens treating assembly of claim 5, wherein said solution container, tray and cover are of substantially circular cross-section.

7. A dipper assembly for immersing a pair of contact lenses in a treating solution, said assembly comprising a foraminous shallow tray with an upstanding peripheral wall, a separator wall bisecting said tray and providing separated compartments on each side thereof, the said separator wall lying within said peripheral wall and being of a height slightly greater than the overall height of a contact lens, and the said tray peripheral wall being substantially higher than said separator wall, a handle post standing upwardly from said separator wall, and foraminous, cup-shaped cover means with a central opening loosely surrounding said handle post so that said cover is supported by said separator wall and rockable thereon to aid in circulation of the treating solution around the lenses in said compartments and thereby insure adequate and uniform exposure of all portions of the lens surfaces to the treating solution, the said cover means further comprising an upstanding peripheral wall loosely nested within and extending substantially above the tray peripheral wall.

8. In combination with the lens dipper assembly of claim 7, a treating solution container having an inside wall just slightly larger than the outside wall of said tray, so as to require only a minimal volume of treating solution to flood the lenses.

References Cited by the Examiner

UNITED STATES PATENTS

| | | | |
|---|---|---|---|
| 1,187,364 | 6/16 | Monnot | 21—87 |
| 1,267,988 | 5/18 | De La Mota | 118—428 |
| 1,485,292 | 2/24 | Popper | 21—95 |
| 1,842,204 | 1/32 | Roberts | 21—95 X |
| 2,302,698 | 11/42 | Kessel | 21—99 |
| 2,360,616 | 10/44 | Olsen | 21—99 |
| 2,783,180 | 2/57 | Whitehead | 118—423 X |
| 2,944,661 | 7/60 | Goldstein | '134—137 |
| 3,019,494 | 2/62 | Horie et al. | 21—87 |

RICHARD D. NEVIUS, *Primary Examiner.*